US008707690B2

(12) United States Patent
Cho et al.

(10) Patent No.: US 8,707,690 B2

(45) Date of Patent: Apr. 29, 2014

(54) HYDRAULIC PUMP CONTROLLER FOR CONSTRUCTION MACHINE

(75) Inventors: Young Sik Cho, Gyeonggi-do (KR); Dal Sik Jang, Seoul (KR)

(73) Assignee: Doosan Infracore Co., Ltd., Incheon (KR)

(*) Notice: Subject to any disclaimer, the term of this patent is extended or adjusted under 35 U.S.C. 154(b) by 484 days.

(21) Appl. No.: 13/141,583

(22) PCT Filed: Dec. 23, 2009

(86) PCT No.: PCT/KR2009/007721

§ 371 (c)(1),
(2), (4) Date: Jun. 22, 2011

(87) PCT Pub. No.: WO2010/074507

PCT Pub. Date: Jul. 1, 2010

(65) Prior Publication Data

US 2011/0262287 A1 Oct. 27, 2011

(30) Foreign Application Priority Data

Dec. 24, 2008 (KR) ........................ 10-2008-0133721
Dec. 24, 2008 (KR) ........................ 10-2008-0133995

(51) Int. Cl.
*F16D 31/02* (2006.01)

(52) U.S. Cl.
USPC .................................. 60/445; 60/444; 60/452

(58) Field of Classification Search
USPC .................................... 60/444, 445, 447, 452
See application file for complete search history.

(56) References Cited

U.S. PATENT DOCUMENTS 4,449,366 A * 5/1984 Sato et al. ........................ 60/444
5,101,628 A * 4/1992 Yoshino .......................... 60/445
7,458,211 B2 * 12/2008 Koo ................................ 60/452

FOREIGN PATENT DOCUMENTS

| | | | |
|---|---|---|---|
| JP | 02-291436 | A | 12/1990 |
| JP | 08-200307 | A | 8/1996 |
| JP | 2008-039063 | A | 2/2008 |
| KR | 10-0152300 | B1 | 10/1998 |
| KR | 10-0281008 | B1 | 2/2001 |

OTHER PUBLICATIONS

Search Report dated Aug. 4, 2010 for International Application No. PCT/KR2009/007721 filed Dec. 23, 2009.

* cited by examiner

*Primary Examiner* — Michael Leslie
(74) *Attorney, Agent, or Firm* — John D. Veldhuis-Kroeze; Westman, Champlin & Koehler, P.A.

(57) ABSTRACT

A hydraulic pump controlling apparatus of a construction machine according to the present disclosure includes: a hydraulic pump in which a swash plate angle is controlled to control a discharge flow; an auxiliary pump; a control valve controlling a flowing direction of a fluid discharged from the hydraulic pump and selectively supplying the fluid to an actuator; an orifice and a relief valve connected between a center bypass line of the control valve and a tank T to be parallel to each other; signal pressure selecting units receiving a fluid passing through the center bypass line of the control valve and a fluid discharged from the auxiliary pump, and selecting the pressure of any one of the fluids as a signal pressure; and a regulator receiving the signal pressure selected from the signal pressure selecting units to control the swash plate angle of the hydraulic pump, and the signal pressure selecting unit selects the pressure of the fluid discharged from the auxiliary pump as the signal pressure and transfers the selected pressure to the regulator when the construction machine is in an idle state.

6 Claims, 10 Drawing Sheets

HYDRAULIC PUMP CONTROLLER FOR CONSTRUCTION MACHINE

This Application is a Section 371 National Stage Application of International Application No. PCT/KR2009/007721, filed Dec. 23, 2009 and published, not in English, as WO2010/074507 on Jul. 1, 2010.

FIELD OF THE DISCLOSURE

The present disclosure relates to a construction machine using oil pressure as a driving source of a working apparatus, such as an excavator, and more particularly, to a hydraulic pump controlling apparatus of a construction machine for controlling a discharge flow of a hydraulic pump.

BACKGROUND OF THE DISCLOSURE

In general, a construction machine such as an excavator includes a plurality of actuators for travelling or driving various working apparatuses and the plurality of actuators are driven by a working fluid discharged from a variable displacement type hydraulic pump driven by an engine or an electric motor.

The flow of the working fluid discharged from the variable displacement type hydraulic pump is controlled depending on a working load to minimize power loss and one example thereof is shown in FIG. 1.

Referring to FIG. 1, a swash plate angle is controlled according to a signal pressure inputted into a regulator 2, and as a result, the discharge flow of the hydraulic pump 1 driven with being directly connected to the engine is controlled. The signal pressure inputted into the regulator 2 is drawn out from a center bypass line 6 passing through a plurality of control valves 3 and a relief valve 4 and an orifice 5 are connected to the center bypass line 6 in parallel to each other.

An operation procedure of the hydraulic pump controlling apparatus having the above-mentioned configuration will be hereinafter described. First, when an operation signal of a control unit such as a joystick is not inputted, the plurality of control valves 3 are positioned in a neutral state. In such a state, a working fluid discharged from the hydraulic pump 1 is discharged to a tank T through the center bypass line 6. At this time, the flow of the working fluid drained to the tank T through the orifice 5 is limited to allow the pressure of the center bypass line 6 to increase up to a relief pressure of the relief valve 4 and the increased pressure is inputted into the regulator 2 to reduce the flow of the hydraulic pump 1 by controlling a swash plate angle of the hydraulic pump 1.

On the contrary, when the control signal is inputted from the control unit, any one of the plurality of control valves 3 is switched, and as a result, the flow of the working fluid that flows through the center bypass line 6 decreases. Therefore, the magnitude of the signal pressure inputted into the regulator 2 decreases, and as a result, the swash plate angle of the hydraulic pump 1 is controlled to increase the flow of the hydraulic pump 1.

According to the hydraulic pump controlling apparatus, even when a working apparatus or a travelling apparatus is not driven, the hydraulic pump 1 should discharge a predetermined flow so that the working fluid of the center bypass line 6 reaches the relief pressure of the relief valve 4. That is, even when the plurality of control valves 3 are all in the neutral state, the hydraulic pump 1 should be driven to supply the predetermined flow to cause the power of the engine to be lost.

Further, since the working fluid discharged from the hydraulic pump 1 is drained to the drain tank T through the orifice 5 and the relief valve 4, the pressure is lost, and as a result, the loss of the power of the engine E further increases and the temperature of the working fluid rises. When the temperature of the working fluid rises, driving precision of each actuator deteriorates and high-price hydraulic components are damaged to shorten a life-span, thereby deteriorating reliability of the construction machine.

The discussion above is merely provided for general background information and is not intended to be used as an aid in determining the scope of the claimed subject matter.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure is contrived to consider the above-mentioned points. An object of the present disclosure is to provide a hydraulic pump controlling apparatus of a construction machine capable of minimizing power loss.

A hydraulic pump controlling apparatus of a construction machine according to the present disclosure includes: a hydraulic pump 10 in which a swash plate angle is controlled to control a discharge flow; an auxiliary pump 14; a control valve 11 controlling a flowing direction of a fluid discharged from the hydraulic pump 10 and selectively supplying the fluid to an actuator 13; an orifice 15 and a relief valve 16 connected between a center bypass line 17 of the control valve 11 and a tank T to be parallel to each other; signal pressure selecting units 20, 120, and 220 receiving a fluid passing through the center bypass line 17 of the control valve 11 and a fluid discharged from the auxiliary pump 14, and selecting the pressure of any one of the fluids as a signal pressure; and a regulator 30 receiving the signal pressure selected from the signal pressure selecting units 20, 120, and 220 to control the swash plate angle of the hydraulic pump 10, and the signal pressure selecting unit 20 selects the pressure of the fluid discharged from the auxiliary pump 14 as the signal pressure and transfers the selected pressure to the regulator 30 when the construction machine is in an idle state.

According to an exemplary embodiment of the present disclosure, the signal pressure selecting unit 20 may include: a valve unit 21 changed between a first position where the pressure of the auxiliary pump 14 is transferred to the regulator 30 and a working fluid of the center bypass line 17 is discharged to the tank T and a second position where the pressure of the center bypass line 17 is transferred to the regulator 30; and a controller 24 changing the valve unit 21 to the first position when a work signal $P_i$ is not inputted and changing the valve unit 21 to the second position when the work signal $P_i$ is inputted.

Further, the valve unit 21 may include: a first valve 22 passing or interrupting a pilot working fluid of the auxiliary pump 14 according to a signal of the controller 24; and a second valve 23 transferring a pilot pressure of the auxiliary pump 14 passing through the first valve 22 to the regulator 30 and discharging the working fluid of the center bypass line 17 to the tank T when the first valve 22 is at a position to pass the pilot working fluid of the auxiliary pump 14 and transferring the pressure of the center bypass line 17 to the regulator 30 when the first valve 22 is at a position to interrupt the pressure of the pilot working fluid of the auxiliary pump 14.

In addition, the hydraulic pump controlling apparatus may further include an auxiliary relief valve 29 discharging the pilot working fluid of the auxiliary pump 14 to the tank T when the pilot pressure of the auxiliary pump 14 is equal to or higher than a reference pressure.

According to another exemplary embodiment of the present disclosure, the signal pressure selecting unit 120 may include: a shuttle valve 123 transferring the larger pressure between the pilot pressure of the auxiliary pump 14 and the pressure of the center bypass line 17 to the regulator 30; a control valve 121 installed between the center bypass line 17 and the tank T to be parallel to the orifice 15 and the relief valve 16 to connect or interrupt the center bypass line 17 to or from the tank T; and a direction switching valve 122 connecting the shuttle valve 123 to the auxiliary pump 14 or connecting the shuttle valve 123 to the tank T, and the control valve 121 and the direction switching valve 122 may be changed depending on the pressure of a valve signal line 124 varying depending on the change of the control valve 11, the control valve 121 may connect the center bypass line 17 to the tank T when the control valve 11 is in a neutral state and interrupt the connection between the center bypass line 17 and the tank T when the control valve 11 is not in the neutral state, and the direction control valve 122 may connect the shuttle valve 123 to the auxiliary pump 14 so that the shuttle valve 123 selects the pressure of the auxiliary pump 14 when the control valve 11 is in the neutral state and connect the shuttle valve 123 to the tank T so that the shuttle valve 123 outputs the pressure of the center bypass line 17 when the control valve 11 is not in the neutral state.

According to yet another exemplary embodiment of the present disclosure, the signal pressure selecting unit 220 may include: a signal pressure selecting valve 221 changed so that the auxiliary pump 14 is connected to the regulator 30 and the working fluid of the center bypass line 17 is discharged to the tank T when a pressure receiving portion 221*a* is connected with the auxiliary pump 14 and changed so that the connection between the auxiliary pump 14 and the regulator 30 is interrupted and the center bypass line 17 is connected to the regulator 30; and a direction switching valve 122 connecting the pressure receiving portion 221*a* of the signal pressure selecting valve 221 to the auxiliary pump 14 or the tank T, and the direction switching valve 222 may be changed according to the signal pressure of the valve signal line 124 in which the pressure varies depending on the change of the control valve 11, and the direction switching valve 222 may connect the pressure receiving portion 221*a* of the signal pressure selecting valve 221 to the auxiliary pump 14 when the control valve 11 is in the neutral state and connect the pressure receiving portion 221*a* of the signal pressure selecting valve 221 to the tank T when the control valve 11 is not in the neutral state.

According to the methods for solving the problems, when a construction machine is in an idle state by a signal pressure selecting unit, the pressure of an auxiliary pump is transferred to a regulator so as to discharge a working fluid of a center bypass line to a tank without passing through a relief valve. As a result, pressure loss and power loss by the relief valve can be minimized and the temperature of the working fluid can be prevented from rising. Accordingly, fuel efficiency of the construction machine can be improved.

Further, when the construction machine is in the idle state, the pressure of the auxiliary pump higher than the pressure of the center bypass line is transferred to the regulator to minimize a discharge flow of the hydraulic pump, and as a result, the fuel efficiency of the construction machine can be further improved.

In addition, the signal pressure selecting unit is constituted by a shuttle valve, a control valve, and a direction switching valve to control the hydraulic pump by using only a hydraulic signal without an electrical signal, and as a result, reliability of the construction machine can be improved.

Moreover, the signal pressure selecting unit is constituted by a signal pressure selecting valve and the direction switching valve to minimize the number of hydraulic components, and as a result, a manufacturing cost can be reduced.

DETAILED DESCRIPTION

Hereinafter, a hydraulic pump controlling apparatus of a construction machine according to exemplary embodiments of the present disclosure will be described in detail.

Figure 1:
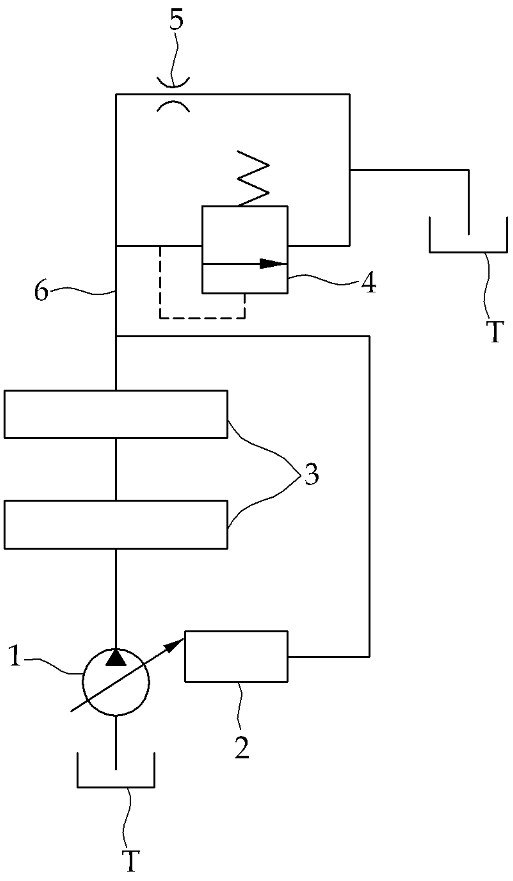
FIG. 1 is a hydraulic circuit diagram schematically showing a known hydraulic pump controlling apparatus.
Figure 2:
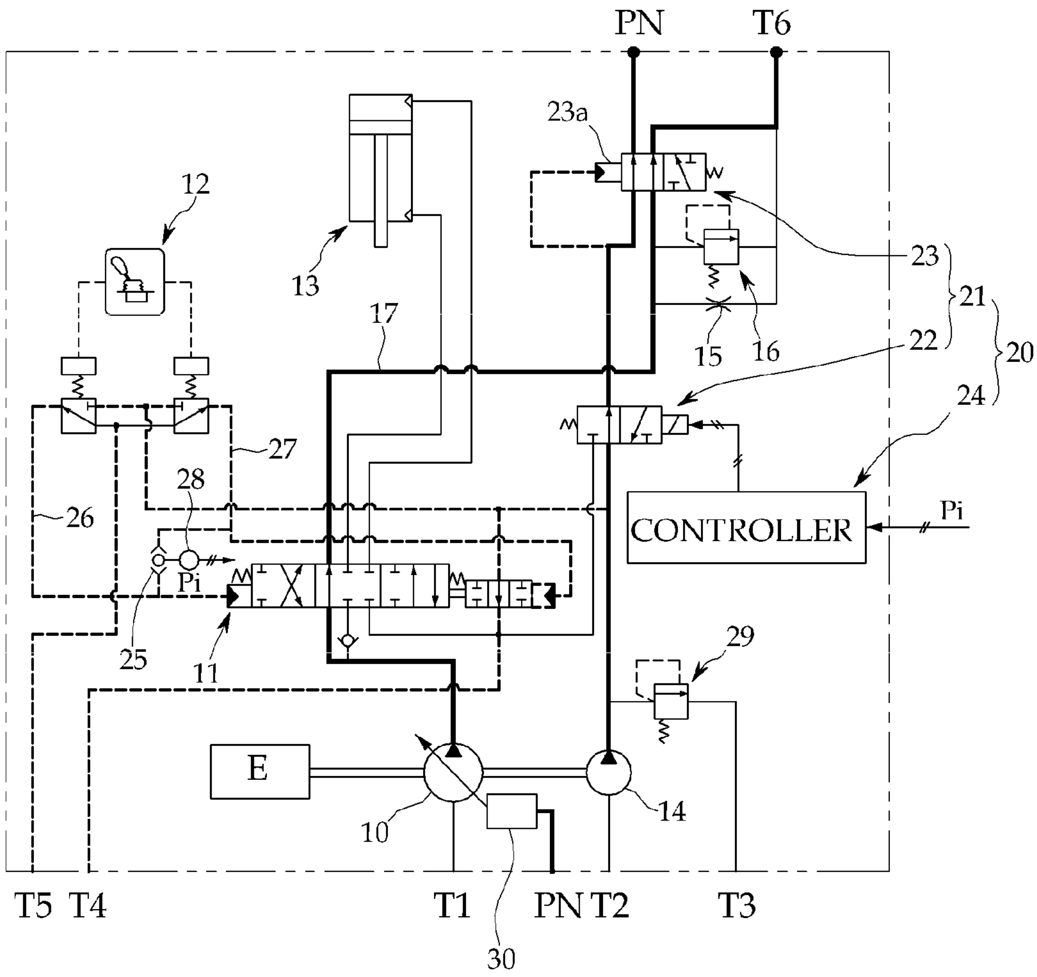
FIGS. 2 and 3 are hydraulic circuit diagrams schematically showing a hydraulic pump controlling apparatus according to a first exemplary embodiment of the present disclosure.

Referring to FIG. 2, a hydraulic pump controlling apparatus of a construction machine according to a first exemplary embodiment of the present disclosure includes a hydraulic pump 10, an auxiliary pump 14, a control valve 11, an orifice 15 and a relief valve 16, a signal pressure selecting unit 20, and a regulator 30.

The hydraulic pump 10 is driven in connection with an engine E and is a variable displacement type pump in which a swash plate angle is controlled to control a discharge flow thereof. A working fluid discharged from the hydraulic pump 10 is supplied to an actuator 13 with its flowing direction controlled by the control valve 11 to drive the actuator 13.

The control valve 11 is changed according to a signal pressure inputted from a control unit 12 to change the flowing direction of the working fluid to be supplied to the actuator 13. When the control valve 11 does not receive the signal pressure from the control unit 12, the control valve 11 maintains a neutral state as shown in FIG. 2 and in such a state, the construction machine is in an idle state not to perform a work.

Figure 3:
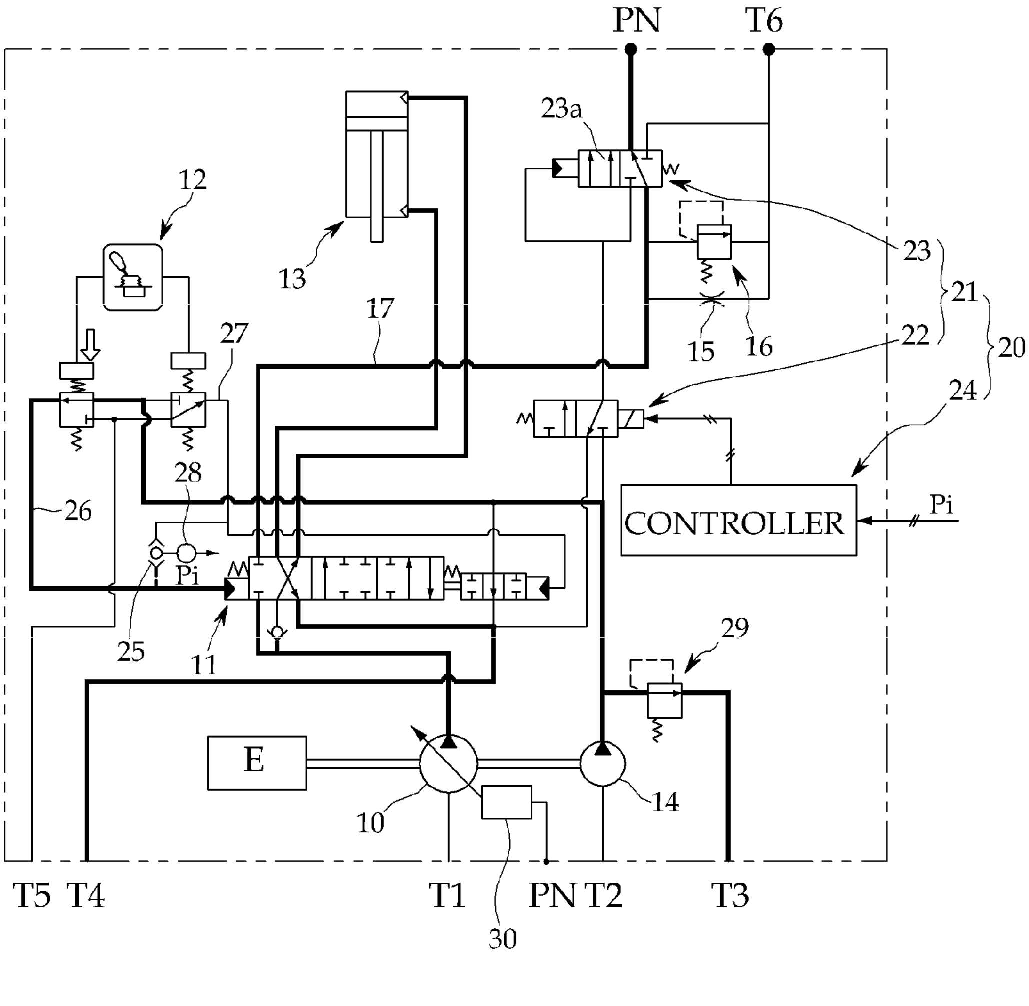

The auxiliary pump 14 serves to discharge a pilot working fluid to be applied to a pressure receiving portion of the control valve 11 as the signal pressure and the auxiliary pump 14 is connected with the control unit 12. As shown in FIG. 2, in the state where the control unit 12 is not controlled, a pilot pressure of the auxiliary pump 14 is not transferred to the pressure receiving portion of the control valve 11 and as shown in FIG. 3, in the state where the control unit 12 is controlled, the pilot pressure of the auxiliary pump 14 is transferred to the pressure receiving portion of the control valve 11 through the control unit 12. As described above, when the pilot pressure is transferred to the pressure receiving portion of the control valve 11, the control valve 11 is changed to one side or the other side to allow the working fluid of the hydraulic pump 10 to be supplied to the actuator 13.

Meanwhile, when the control valve 11 is in the neutral state, the working fluid of the hydraulic pump 10 is drained to a tank T6 through a center bypass line 17. At this time, the orifice 15 and the relief valve 16 are installed between the center bypass line 17 and the tank T6 to be parallel to each other. The orifice 15 limits the flow of the working fluid of the center bypass line 17 discharged to the tank T6 to serve to increase the pressure of the center bypass line 17. When the pressure of the center bypass line 17 reaches the relief pressure of the relief valve 16, the relief valve 16 is changed to discharge the working fluid of the center bypass line 17 to the tank T6. As such, the reason for increasing the pressure of the center bypass line 17 up to the relief pressure when the construction machine is in the idle state is that the center bypass line 17 transfers a large pressure to the regulator 30 of the hydraulic pump 10 to reduce the discharge flow of the hydraulic pump 10.

However, when the construction machine is in the idle state, discharging the working fluid to the tank T6 through the relief valve 16 after increasing the working fluid of the center bypass line 17 up to the relief pressure causes an energy loss to be increased and the temperature of the working fluid to rise. Therefore, in the exemplary embodiment, through the signal pressure selecting unit 20, the pilot pressure of the auxiliary pump 14 is transferred to the regulator 30 when the construction machine is in the idle state and the pressure of the center bypass line 17 is transferred to the regulator 30 when the construction machine is not in the idle state. As a result, when the construction machine is in the idle state, the discharge flow of the hydraulic pump 10 can be reduced in spite of lowering the pressure of the center bypass line 17, thereby minimizing the energy loss and preventing the temperature of the working fluid from rising.

More specifically, the signal pressure selecting unit 20 serves to select the signal pressure transferred to the regulator 30 and includes a valve unit 21 and a controller 24 for controlling the change of the valve unit 21.

The valve unit 21 includes a first valve 22 to pass or interrupt the pilot working fluid of the auxiliary pump 14 according to a signal of the controller 24 and a second valve 23 to transfer any one pressure of the pilot pressure passing through the first valve 22 and the pressure of the center bypass line 17 to the regulator 30.

One side of the first valve 22 is connected to a tank T4 and the auxiliary pump 14 and the other side of the first valve 22 is connected to a pressure receiving portion 23*a* and an inlet of the second valve 23. When the first valve 22 is changed to a state shown in FIG. 2, the working fluid of the auxiliary pump 14 is inputted into the pressure receiving portion 23*a* of the second valve 23 to change the second valve 23 to a state shown in FIG. 2. So, the second valve 23 transfers the pressure of the auxiliary pump 14 to the regulator 30 as a signal pressure PN, and connects the center bypass line 17 to the tank T6 to discharge the working fluid of the center bypass line 17 to a tank T.

On the contrary, when the first valve 22 is changed to a state shown in FIG. 3, the auxiliary pump 14 is interrupted from the second valve 23 and the working fluid discharged from the auxiliary pump 14 is drained to a tank T3 through an auxiliary relief valve 29. At this time, the pressure receiving portion 23*a* of the second valve 23 is connected to the tank T4, and as a result, the second valve 23 is changed to the state shown in FIG. 3 by a spring. Therefore, the center bypass line 17 is connected with the regulator 30 to transfer the pressure of the center bypass line 17 to the regulator 30.

The controller 24 serves to control the change of the first valve 22 and receives a pressure amount detected by a pressure sensor 28. The pressure sensor 28 is connected to an outlet of a pilot shuttle valve 25 to sense the larger pressure amount between the pressures of a pair of pilot lines 26 and 27 of the control unit 12. By this configuration, as shown in FIG. 3, when the control unit 12 is controlled, the pressure sensor 28 senses a control pressure $P_i$ and outputs the sensed control pressure to the controller 24. Therefore, the controller 24 applies power to a signal applying unit of the first valve 22 to change the first valve 22 as shown in FIG. 3.

Hereinafter, an operation of the hydraulic pump controlling apparatus of the construction machine having the above-mentioned configuration will be described in detail.

First, while the construction machine is in the idle state, that is, the control unit 12 is not controlled, a control signal $P_i$ outputted from the pressure sensor 28 is inputted into the controller 24. Therefore, since the control unit 12 is not controlled, the controller 24 does not apply the power to the signal applying unit of the first valve 22, and as a result, the first valve 22 is maintained in the state shown in FIG. 2, such that the pilot pressure of the auxiliary pump 14 is selected as the signal pressure PN to be applied to the regulator 30 and the working fluid of the center bypass line 17 is drained to the tank T6.

Meanwhile, when the control unit 12 is controlled, the control signal $P_i$ is inputted into the controller 24 by the pressure sensor 28. Therefore, the controller 24 applies the power to the signal applying unit of the first valve 22 to change the first valve 22 to the state shown in FIG. 3. Accordingly, the pressure receiving portion 23*a* of the second valve 23 is connected to the tank T4, and as a result, the second valve 23 is changed to the state shown in FIG. 3. Therefore, the pressure of the center bypass line 17 is selected as the signal pressure PN to be transferred to the regulator 30.

FIGS. 4 to 9 are diagrams schematically showing a hydraulic pump controlling apparatus according to a second exemplary embodiment of the present disclosure. Herein, the same reference numerals refer to the same components of the second exemplary embodiment and a third exemplary embodiment as the first exemplary embodiment.

Although the signal inputted into the regulator 30 of the hydraulic pump 10 has been selected by the control signal of the controller 24 in the exemplary embodiment, the signal inputted into the regulator 30 is selected hydraulically in the second exemplary embodiment of the present disclosure. Further, although a hydraulic system using two hydraulic pumps is exemplified in the second exemplary embodiment, control methods for the two hydraulic pumps are the same as each other. Therefore, only a controlling apparatus of a right hydraulic pump of FIG. 4 will be described.

Figure 4:
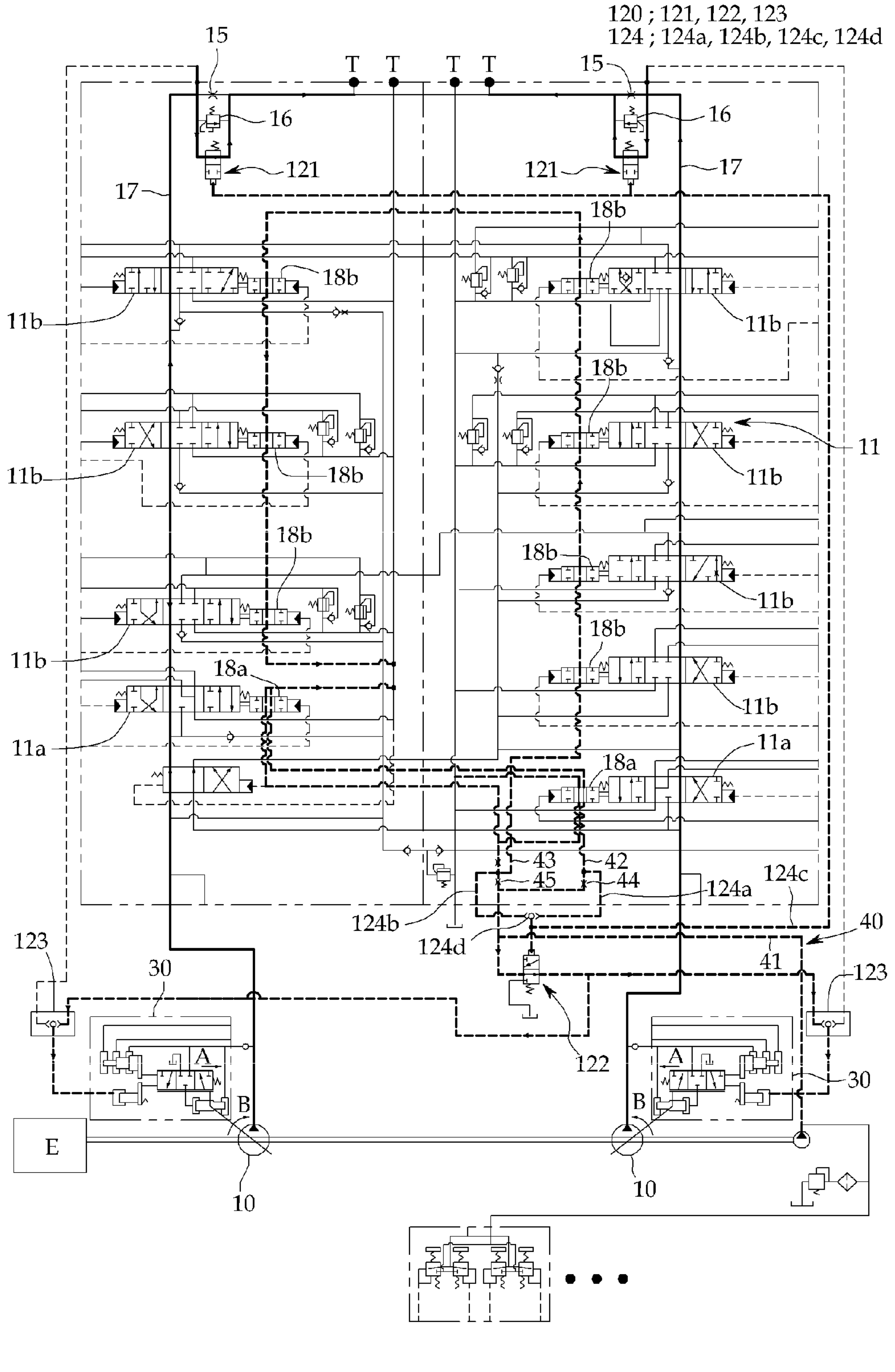
FIGS. 4 to 9 are hydraulic circuit diagrams schematically showing a hydraulic pump controlling apparatus according to a second exemplary embodiment of the present disclosure.

Referring to FIG. 4, a signal pressure selecting unit 120 according to the second exemplary embodiment of the present disclosure includes a shuttle valve 123 transferring a large pressure between the pilot pressure of the auxiliary pump 14 and the pressure of the center bypass line 17 to the regulator 30, a control valve 121 installed between the center bypass line 17 and the tank T to be parallel to the orifice 15 and the relief valve 16 to connect or interrupt the center bypass line 17 to or from the tank T, and a direction switching valve 122 connecting the shuttle valve 123 to the auxiliary pump 14 or connecting the shuttle valve 123 to the tank T.

An inlet of the shuttle valve 123 is connected to the direction switching valve 122 and the center bypass line 17 and an outlet of the shuttle valve 123 is connected to the regulator 30.

Figure 6:
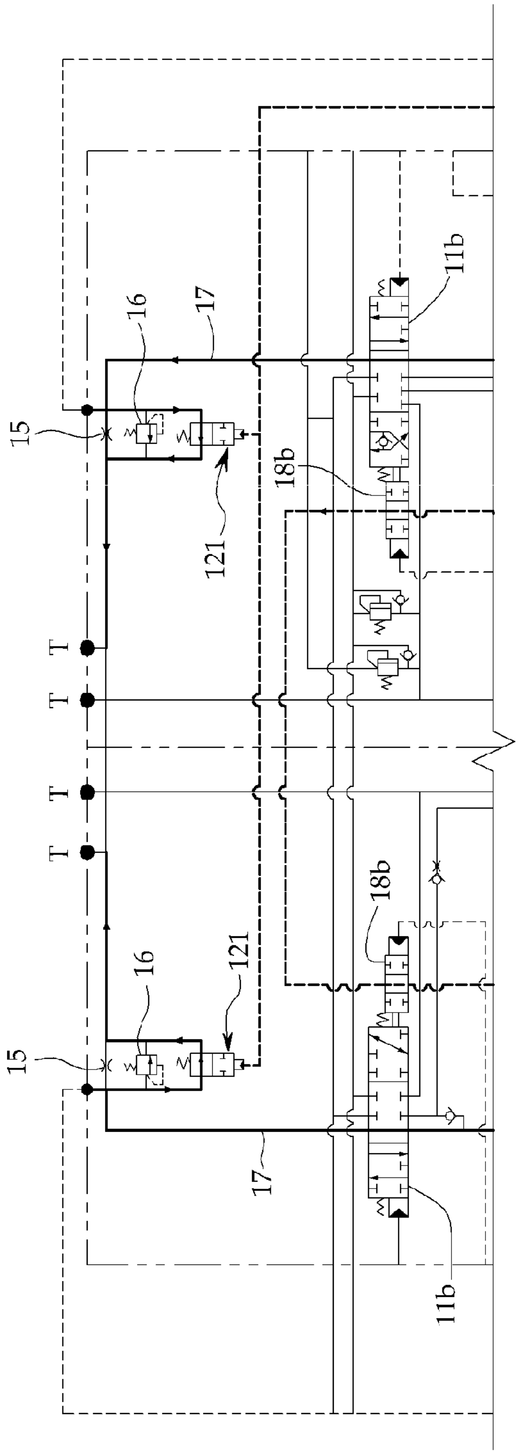

The control valve 121 is changed according to a signal pressure of the valve signal line 124, and drains the working fluid of the center bypass line 17 to the tank T when the pressure of the valve signal line 124 is low as shown in FIGS. 4 and 6 and prevents the working fluid of the center bypass line 17 to be drained when the pressure of the valve signal line 124 is high.

The direction switching valve 122 is changed according to the signal pressure of the valve signal line 124, and transfers the pilot pressure of the auxiliary pump 14 to the shuttle valve 123 when the signal pressure of the valve signal line 124 is low and interrupts the connection between the auxiliary pump 14 and the shuttle valve 123 and connects the shuttle valve 123 to the tank T when the signal pressure of the valve signal line 124 is high.

The valve signal line 124 includes a first valve signal line 124*a* of which the signal pressure varies depending on the change of a travelling control valve 11*a* among the plurality of control valves 11, a second valve signal line 124*b* of which the signal pressure varies depending on the change of a control valve 11*b* other than the travelling control valve 11*a*, and a third valve signal line 124*c* selecting the larger pressure between the pressures of the first valve signal line 124*a* and the second valve signal line 124*b* and applying the selected pressure to the control valve 121 and the direction switching valve 122 as the signal pressure. The first to third valve signal lines 124*a*, 124*b*, and 124*c* are connected through a signal shuttle valve 124*d*.

Meanwhile, the first and second valve signal lines 124*a* and 124*b* are drawn out from a pilot hydraulic line 40. The pilot hydraulic line 40 includes a main pilot hydraulic line 41, and a first pilot hydraulic line 42 and a second pilot hydraulic line 43.

The main pilot hydraulic line 41 is connected to the auxiliary pump 14 to supply the pilot working fluid of the auxiliary pump 14. A part of the working fluid discharged from the auxiliary pump 14 is supplied to the direction switching valve 122 and the remaining part of the pilot working fluid of the auxiliary pump 14 is supplied to the first and second pilot hydraulic lines 42 and 43.

The first pilot hydraulic line 42 is connected to a drain line through a logic valve 18*a* of the travelling control valve 11*a*. In addition, the first valve signal line 124*a* is drawn out from a rear end of a first signal orifice 44 of the first pilot hydraulic line 42. Accordingly, when the traveling control valve 11*a* is changed, the logic valve 18*a* interrupts the first pilot hydraulic line 42 and the drain line to increase the pressure of the first pilot hydraulic line 42, and as a result, the pressure of the first valve signal line 124*a* increases.

The second pilot hydraulic line 43 is connected to the drain line through a logic valve 18*b* of a work control valve 11*b* other than the travelling control valve 11*a*. In addition, the second valve signal line 124*b* is drawn out from a rear end of a second signal orifice 45 of the second pilot hydraulic line 43. Accordingly, when any one of the traveling control valves 11*b* is changed, the logic valve 18*b* interrupts the first pilot hydraulic line 43 and the drain line to increase the pressure of the second pilot hydraulic line 43, and as a result, the pressure of the second valve signal line 124*b* increases.

When the pressure of any one of the first and second valve signal lines 124*a* and 124*b* increases, the pressure of the third valve signal line 124*c* increases.

Hereinafter, an operation process of the hydraulic pump controlling apparatus of the construction machine according to the second exemplary embodiment of the present disclosure having the above-mentioned configuration will be described in detail.

Figure 5:
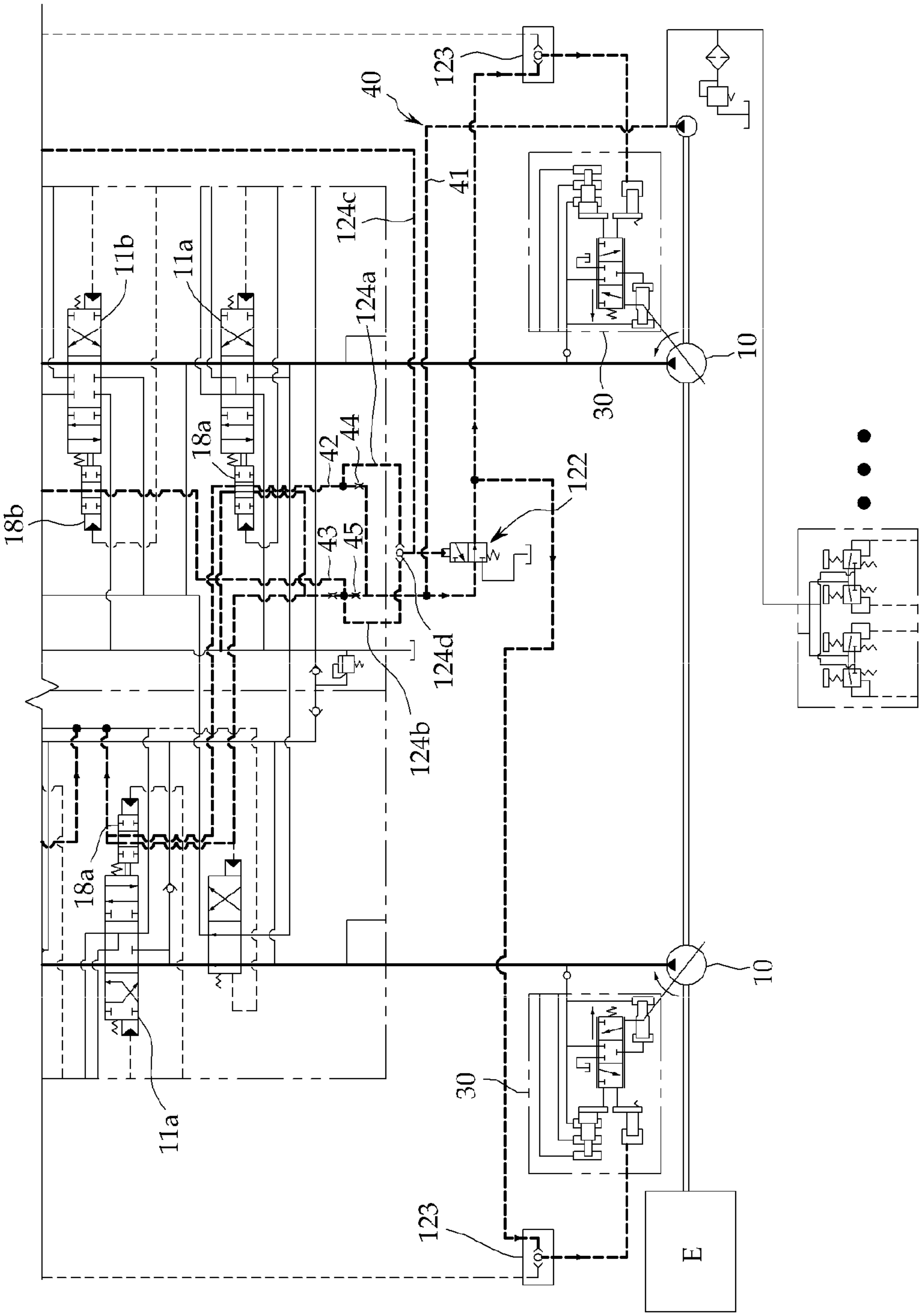

FIGS. 4 to 6 are hydraulic circuit diagrams showing the case in which the construction machine is in the idle state.

Referring to FIGS. 4 to 6, since the control valve 11 is in the neutral state not to be changed, the pressures of the first and second pilot hydraulic lines 42 and 43 are low, and as a result, the pressures of the first to third valve signal lines 124*a*, 124*b*, and 124*c* are low. Accordingly, the control valve 121 and the direction switching valve 122 that are changed according to the signal pressure of the third valve signal line 124*c* are not changed and maintain an initial state shown in FIGS. 4 to 6. In such a state, the direction switching valve 122 applies the pilot pressure of the auxiliary pump 14 to the shuttle valve 123 and the shuttle valve 123 selects the pilot pressure of the auxiliary pump 14 as the signal pressure and transfers the selected pilot pressure to the regulator 30. At this time, the control valve 121 connects the center bypass line 17 to the tank T.

Figure 7:
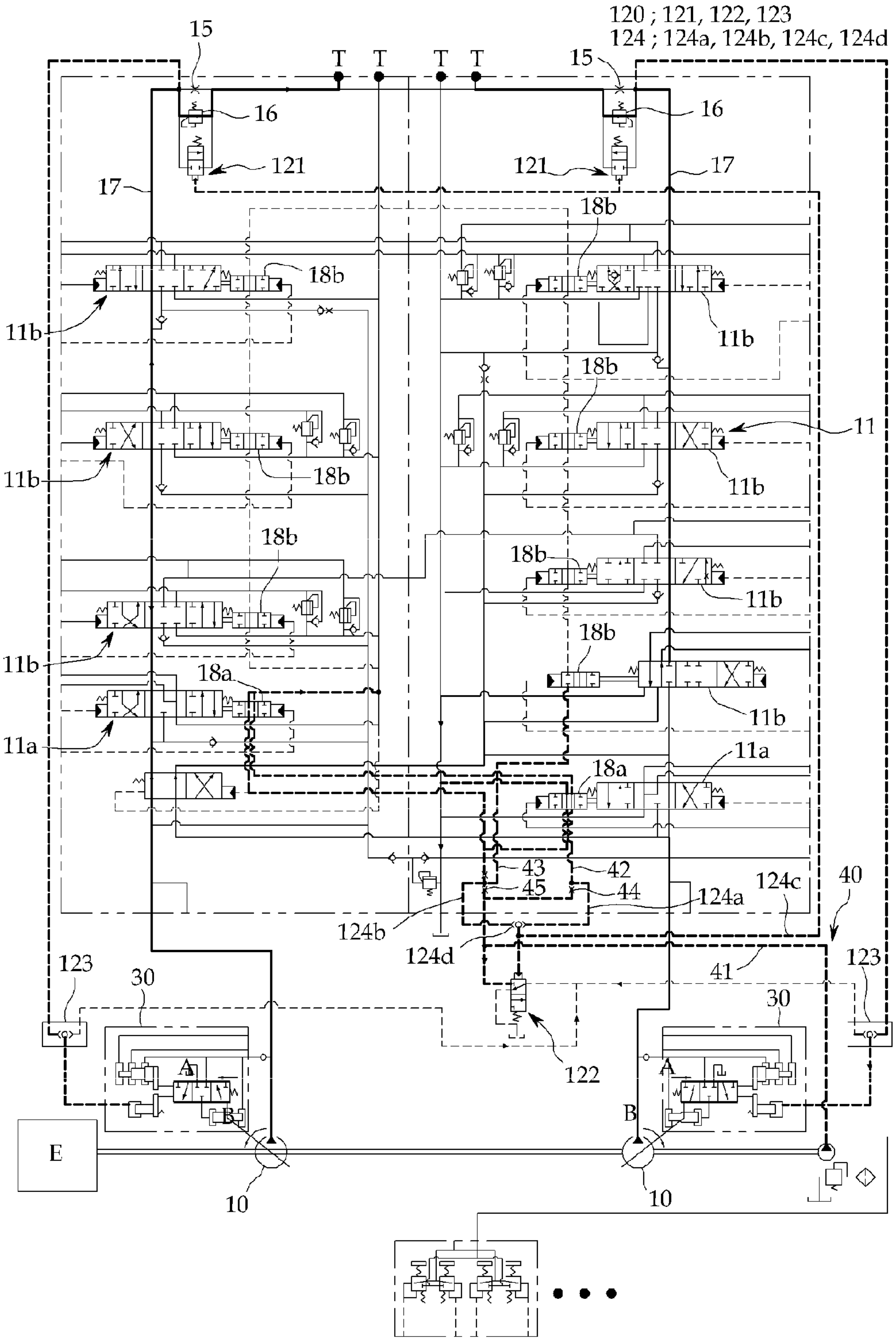
Figure 8:
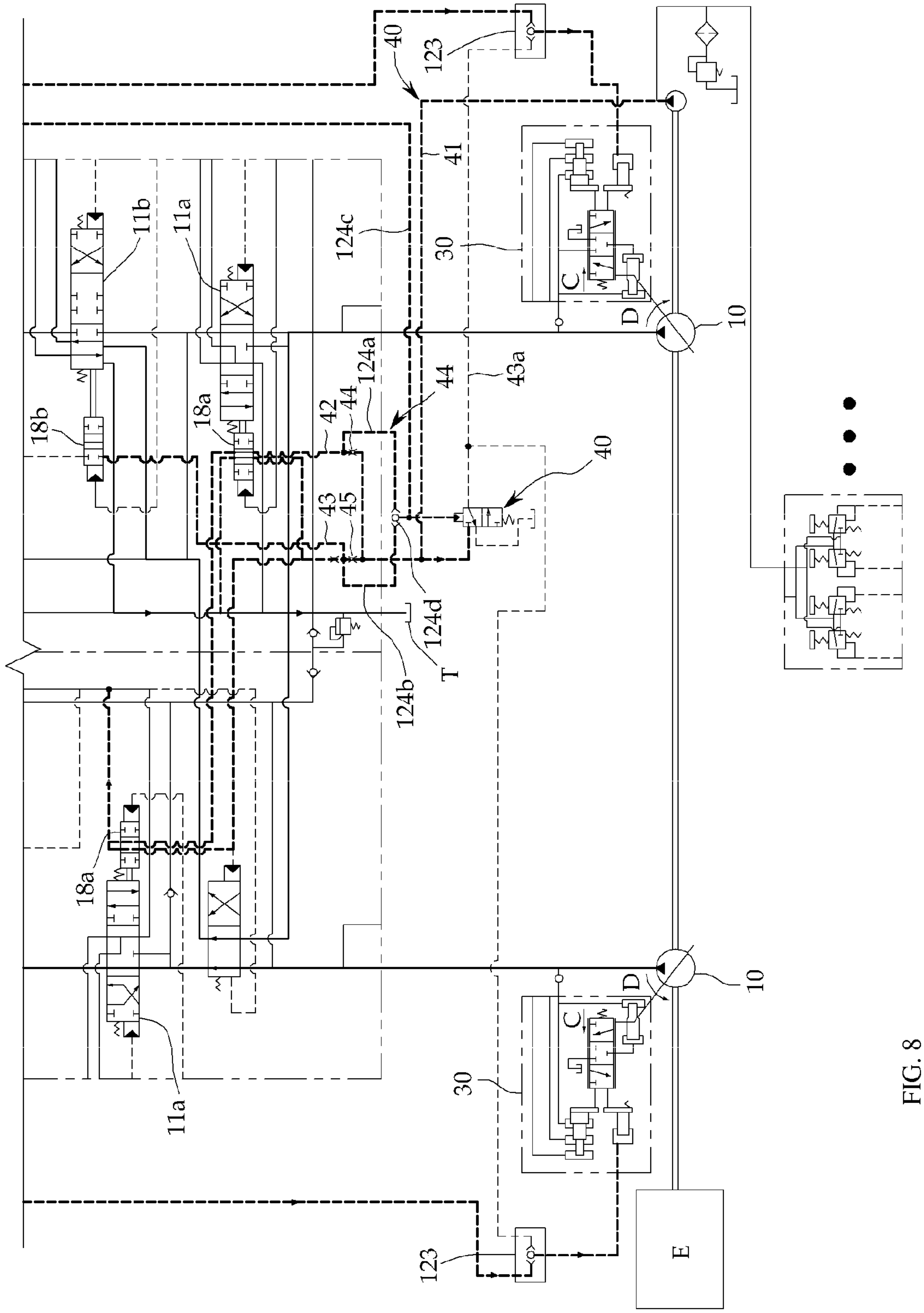
Figure 9:
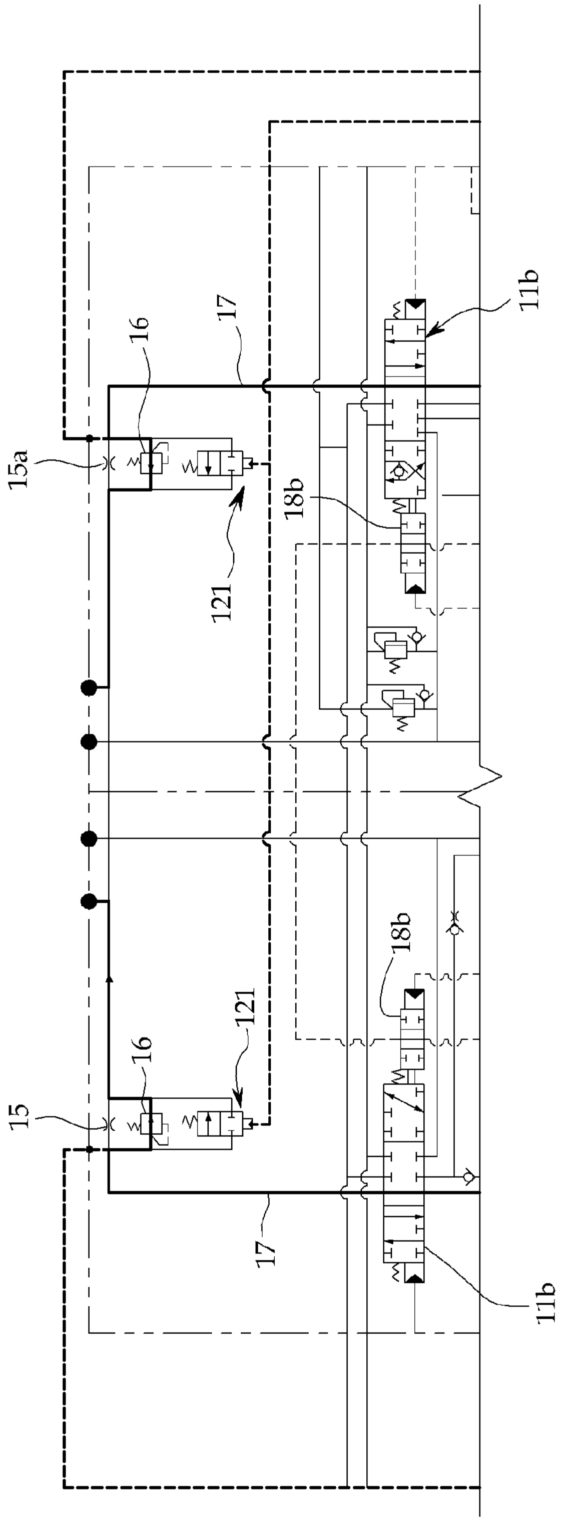

FIGS. 7 to 9 are diagrams schematically showing a hydraulic circuit diagram when the construction machine is not in the idle state but in a working state and show a state in which a part of the control valve 11 is changed.

In such a state, the second pilot hydraulic line 43 is interrupted from the drain line, and as a result, the pressure of the second valve signal line 124*b* increases. Therefore, a high pressure is outputted to the third valve signal line 124*c* and thus applied to the control valve 121 and the direction switching valve 122. So, the direction switching valve 122 and the control valve 121 are changed to a state shown in FIGS. 7 to 9. Therefore, the direction switching valve 122 connects the shuttle valve 123 to the tank T and the control valve 121 interrupts the center bypass line 17. So, the pressure of the center bypass line 17 increases and the pressure is inputted into the shuttle valve 123 to be selected as the signal pressure. The selected signal pressure of the center bypass line 17 is inputted into the regulator 30.

Figure 10:
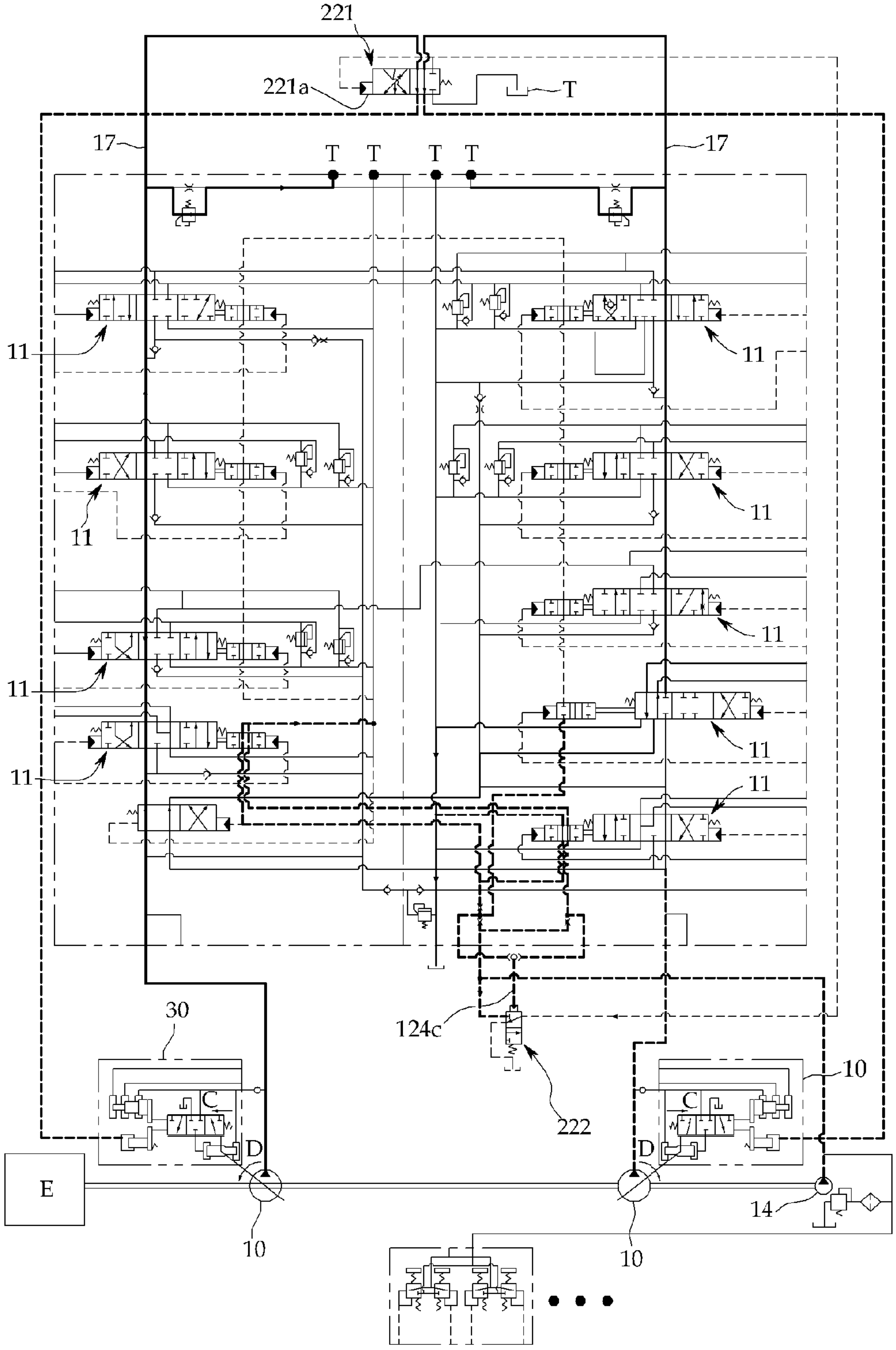
FIG. 10 is a hydraulic circuit diagram schematically showing a hydraulic pump controlling apparatus according to a third exemplary embodiment of the present disclosure.

FIG. 10 is a circuit diagram schematically showing a hydraulic pump controlling apparatus according to a third exemplary embodiment of the present disclosure.

The third exemplary embodiment of the present disclosure is merely different from the second exemplary embodiment of the present disclosure in that two control valves 121 and two shuttle valves 123 adopted in the second exemplary embodiment are implemented as one signal pressure selecting valve 221 in the third exemplary embodiment and the both exemplary embodiments are the same as each other in other components. Accordingly, hereinafter, only points different from the second exemplary embodiment will be described.

The signal pressure selecting unit 220 according to the third exemplary embodiment of the present disclosure includes a signal pressure selecting valve 221 and a direction switching valve 222. Since the direction switching valve 222 is the same as that of the second exemplary embodiment of the present disclosure, a detailed description thereof will be omitted.

One side of the signal pressure selecting valve 221 is connected to two center bypass lines 17 and the direction switching valve 222 and the other side thereof is connected to the two regulators 30 and the tank T. Meanwhile, a signal pressure transferred from the direction switching valve 222 is applied to a pressure receiving portion 221*a* of the signal pressure selecting valve 221.

When the construction machine is in the idle state, the signal pressure selecting valve 221 connects two center bypass lines 17 with the tank T, and selects the pilot pressure of the auxiliary pump 14 transferred through the direction switching valve 222 as the signal pressure and transfers the selected pilot pressure to the regulator 30. On the contrary, when the construction machine is in the working state, the pressures of two center bypass lines 17 are selected as the signal pressure and transferred to the regulator 30 and a pilot working fluid of the signal pressure selecting valve 221 is drained to the tank T through the direction switching valve 222.

Hereinafter, an operation of the hydraulic pump controlling apparatus having the above-mentioned configuration will be described.

FIG. 10 shows the case in which the construction machine is in the working state. When any one of the plurality of control valves 11 is changed, the pressure of the third valve signal line 124*c* increases. As a result, the direction switching valve 222 is changed to a state shown in FIG. 10. Therefore, the working fluid of the pressure receiving portion 221*a* of the signal pressure selecting valve 221 is drained to the tank T and the signal pressure selecting valve 221 is changed to a state shown in FIG. 10. So, two center bypass lines 17 are connected to the regulator 30.

On the contrary, when the construction machine is in the idle state, the pressure of the third valve signal line 124*c* decreases. As a result, the direction switching valve 222 is changed to an opposite state to the state shown in FIG. 10. Therefore, the pilot pressure of the auxiliary pump 14 is transferred to the pressure receiving portion 221*a* of the signal pressure selecting valve 221, and as a result, the signal pressure selecting valve 221 is changed to an opposite state to the state shown in FIG. 10. So, the signal pressure selecting valve 221 drains the working fluid of two center bypass lines 17, and selects the pilot pressure of the auxiliary pump 14 transferred through the direction switching valve 222 as the signal pressure and transfers the selected pilot pressure to the regulator 30.

As described above, although certain exemplary embodiments of the present disclosure have been described in detail, it is to be understood by those skilled in the art that the spirit and scope of the present disclosure are not limited to the certain exemplary embodiments, but are intended to cover various modifications and changes without departing from the gist.

Accordingly, since the above-mentioned exemplary embodiments are provided to inform those skilled in the art of the scope of the present disclosure, it should be understood that they are exemplary in all aspects and not limited and the present disclosure is just defined by the scope of the appended claims.

The present disclosure as above can be applied to various construction machines driven by using various oil pressures, such as an excavator, a wheel loader, and the like.

The invention claimed is:

1. A hydraulic pump controlling apparatus of a construction machine, comprising:

a hydraulic pump in which a swash plate angle is controlled to control a discharge flow;

an auxiliary pump;

a control valve controlling a flowing direction of a fluid discharged from the hydraulic pump and selectively supplying the fluid to an actuator;

an orifice and a relief valve connected between a center bypass line of the control valve and a tank (T) to be parallel to each other;

signal pressure selecting unit receiving a fluid passing through the center bypass line of the control valve and a fluid discharged from the auxiliary pump, and selecting the pressure of any one of the fluids as a signal pressure; and a regulator receiving the signal pressure selected from the signal pressure selecting units to control the swash plate angle of the hydraulic pump, wherein the signal pressure selecting unit selects the pressure of the fluid discharged from the auxiliary pump as the signal pressure and transfers the selected pressure to the regulator when the construction machine is in an idle state.

2. The apparatus of claim 1, wherein the signal pressure selecting unit includes:

a valve unit changed between a first position where the pressure of the auxiliary pump is transferred to the regulator and a working fluid of the center bypass line is discharged to the tank (T) and a second position where the pressure of the center bypass line is transferred to the regulator; and a controller changing the valve unit to the first position when a work signal ($P_i$) is not inputted and changing the valve unit to the second position when the work signal ($P_i$) is inputted.

3. The apparatus of claim 2, wherein the valve unit includes:

a first valve passing or interrupting a pilot working fluid of the auxiliary pump according to a signal of the controller; and a second valve transferring a pilot pressure of the auxiliary pump passing through the first valve to the regulator and discharging the working fluid of the center bypass line to the tank (T) when the first valve is at a position to pass the pilot working fluid of the auxiliary pump and transferring the pressure of the center bypass line to the regulator when the first valve is at a position to interrupt the pressure of the pilot working fluid of the auxiliary pump.

4. The apparatus of claim 3, further comprising an auxiliary relief valve discharging the pilot working fluid of the auxiliary pump to the tank (T) when the pilot pressure of the auxiliary pump is equal to or higher than a reference pressure.

5. The apparatus of claim 1, wherein the signal pressure selecting unit includes:

a shuttle valve transferring the larger pressure between the pilot pressure of the auxiliary pump and the pressure of the center bypass line to the regulator;

a control valve installed between the center bypass line and the tank (T) to be parallel to the orifice and the relief valve to connect or interrupt the center bypass line to or from the tank (T); and a direction switching valve connecting the shuttle valve to the auxiliary pump or connecting the shuttle valve to the tank (T), wherein the control valve and the direction switching valve are changed depending on the pressure of a valve signal line varying depending on the change of the control valve, the control valve connects the center bypass line to the tank (T) when the control valve is in a neutral state and interrupts the connection between the center bypass line and the tank (T) when the control valve is not in the neutral state, and the direction control valve connects the shuttle valve to the auxiliary pump so that the shuttle valve selects the pressure of the auxiliary pump when the control valve his in the neutral state and connects the shuttle valve to the tank (T) so that the shuttle valve outputs the pressure of the center bypass line when the control valve is not in the neutral state.

6. The apparatus of claim 1, wherein the signal pressure selecting unit includes:

a signal pressure selecting valve changed so that the auxiliary pump his connected to the regulator and the working fluid of the center bypass line is discharged to the tank (T) when a pressure receiving portion is connected with the auxiliary pump and changed so that the connection between the auxiliary pump and the regulator is interrupted and the center bypass line is connected to the regulator; and a direction switching valve connecting the pressure receiving portion of the signal pressure selecting valve to the auxiliary pump or the tank (T), wherein the direction switching valve is changed according to the signal pressure of the valve signal line in which the pressure varies depending on the change of the control valve, and the direction switching valve connects the pressure receiving portion of the signal pressure selecting valve to the auxiliary pump when the control valve is in the neutral state and connects the pressure receiving portion of the signal pressure selecting valve to the tank (T) when the control valve is not in the neutral state.

* * * * *

UNITED STATES PATENT AND TRADEMARK OFFICE

CERTIFICATE OF CORRECTION

PATENT NO. : 8,707,690 B2
APPLICATION NO. : 13/141583
DATED : April 29, 2014
INVENTOR(S) : Young Sik Cho et al.

It is certified that error appears in the above-identified patent and that said Letters Patent is hereby corrected as shown below:

In the Claims:

Column 10

Line 65, delete “his” and insert --is--

Signed and Sealed this
Twenty-first Day of October, 2014

Michelle K. Lee

Michelle K. Lee
*Deputy Director of the United States Patent and Trademark Office*